United States Patent
Liu

(10) Patent No.: US 11,877,326 B2
(45) Date of Patent: Jan. 16, 2024

(54) WIRELESS COMMUNICATION METHOD AND COMMUNICATION DEVICE

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 413 days.

(21) Appl. No.: 17/161,322

(22) Filed: Jan. 28, 2021

(65) Prior Publication Data

US 2021/0153265 A1    May 20, 2021

Related U.S. Application Data

(63) Continuation of application No. PCT/CN2018/103085, filed on Aug. 29, 2018.

(51) Int. Cl.
   *H04W 76/10*   (2018.01)
   *H04L 45/74*   (2022.01)
   *H04W 48/16*   (2009.01)

(52) U.S. Cl.
   CPC .......... *H04W 76/10* (2018.02); *H04L 45/74* (2013.01); *H04W 48/16* (2013.01); *H04L 2212/00* (2013.01)

(58) Field of Classification Search
   CPC ...... H04W 76/10; H04W 48/16; H04L 45/74; H04L 2212/00
   See application file for complete search history.

(56) References Cited

U.S. PATENT DOCUMENTS

2014/0162688 A1*  6/2014  Edge ............... H04W 4/06
                                              455/456.1

FOREIGN PATENT DOCUMENTS

| CN | 104244442 A | 12/2014 |
| CN | 106686607 A | 5/2017 |
| CN | 108028793 A | 5/2018 |
| EP | 2509345 A1 | 10/2012 |
| WO | WO2015/200326 A1 | 12/2015 |
| WO | WO2017/107644 A1 | 6/2017 |
| WO | WO2018/044144 A1 | 3/2018 |
| WO | WO2018/068191 A1 | 4/2018 |
| WO | WO2018/100129 A1 | 6/2018 |
| WO | WO2020/042037 A1 | 3/2020 |

OTHER PUBLICATIONS

Guangdong OPPO Mobile Telecommunications Corp. Ltd., Extended European Search Report, 18931712.6, dated Jul. 14, 2021, 8 pgs.

(Continued)

*Primary Examiner* — Diane D Mizrahi
(74) *Attorney, Agent, or Firm* — Morgan, Lewis & Bockius LLP

(57) ABSTRACT

A wireless communication method includes: receiving, by a network device, a data packet which is transmitted from a first terminal device through a control plane or a user plane within a 3rd Generation Partnership Project (3GPP) network; and sending, by the network device, the data packet to a second terminal device through the control plane or the user plane within the 3GPP network.

10 Claims, 5 Drawing Sheets

(56) References Cited

OTHER PUBLICATIONS

Guangdong OPPO Mobile Telecommunications Corp. Ltd., Communication Pursuant to Article 94(3), EP18931712.6, dated Sep. 21, 2022, 6 pgs.
OPPO Guangdong Mobile Telecommunications Corp. Ltd., Second Office Action, CN202110184544.8, dated Aug. 24, 2022, 10 pgs.
Guangdong OPPO Mobile Telecommunications Corp. Ltd., Communication Pursuant to Article 94(3), EP18931712.6, dated Mar. 21, 2022, 5 pgs.
OPPO Guangdong Mobile Telecommunications Corp. Ltd., First Office Action, CN202110184544.8, dated Feb. 9, 2022, 18 pgs.
Guangdong OPPO Guangdong Mobile Telecommunications Corp. Ltd., Examination Report, IN202117011017, dated Feb. 2, 2022, 6 pgs.
Huawei, HiSilicon, Solution for KI#4 and KI#5: Basic architecture for supporting dynamic 5G LAN-type service and 5GLAN communication, 3GPP TSG-SA WG2 Meeting #128bis, S2-188383, Sophia Antipolis, France, Aug. 20-Aug. 24, 2018, 3 pgs.
Huawei, HiSilicon, Intel, InterDigital Inc., Support for 5GLAN communication service key issue, 3GPP TSG-SA WG2 Meeting #128, S2-187469, Jul. 2-6, 2018, Vilnius, Lithuania, 4 pgs.
Huawei, HiSilicon, China Mobile, Use cases of 5G LAN-type service and architectural principles, SA WG2 Meeting #128Bis, S2-188501, Aug. 20-24, 2018, Sophia Antipolis, France, 3 pgs.
Intel, Solution for support of 5G LAN-type service and 5GLAN communication, SA WG2 Meeting #128-BIS, S2-188498, Aug. 20-24, 2018, Sophia Antipolis, France, 5 pgs.
Vivo, Solution for how to support 5G LAN group communication, SA WG2 Meeting #128-bis, S2-187937, Aug. 20-24, 2018, Sophia Antipolis, France, 6 pgs.
Guangdong OPPO Mobile Telecommunications Corp. Ltd., EP18931712.6, Third Office Action, dated Mar. 31, 2023, 5 pgs.
Guangdong OPPO Mobile Telecommunications Corp. Ltd., International Search Report and Written Opinion, PCT/CN2018/103085, dated Apr. 28, 2019, 11 pgs.
3GPP TR 22.821 V16.1.0 (Jun. 2018) 3rd Generation Partnership Project; Technical Specification Group Services and System Aspects; Feasibility Study on LAN Support in 5G (Release 16), 52 pgs.
3GPP TS 23.501 V15.0.0 (Dec. 2017), 3rd Generation Partnership Project; Technical Specification Group Services and System Aspects; System Architecture for the 5G System; Stage 2 (Release 15), 181 pgs.

* cited by examiner

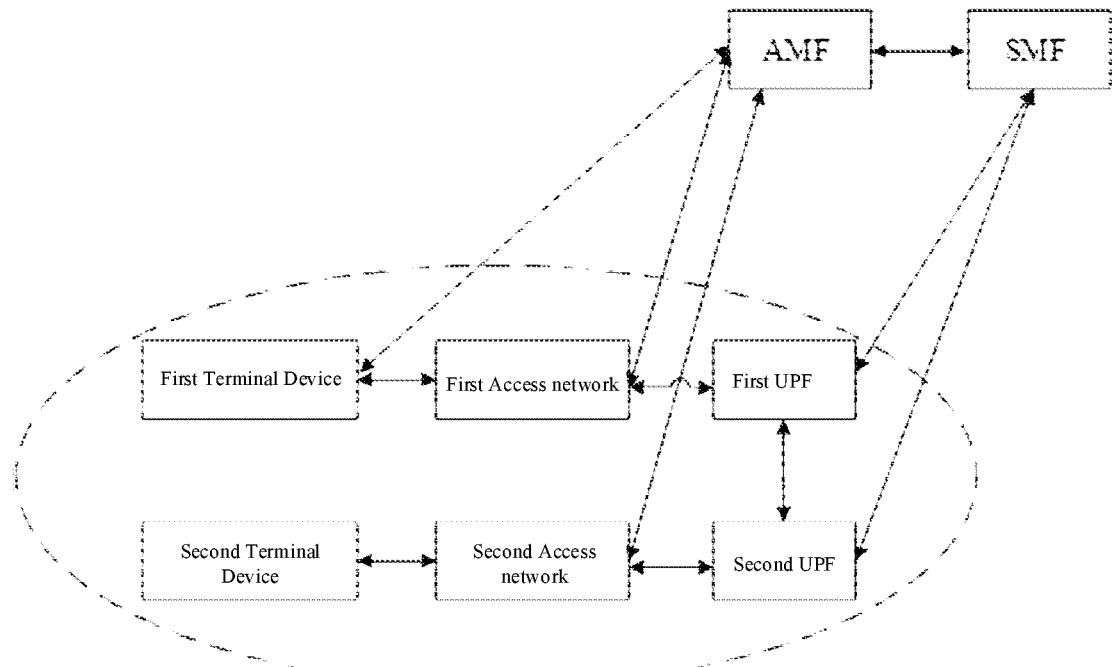

FIG. 1

A network device receives a data packet which is transmitted from a first terminal device through a control plane or a user plane in a 3GPP network — 110

The network device sends the data packet to the second terminal device through the control plane or the user plane in the 3GPP network — 120

FIG. 2

A core network control plane entity sends address information of a session connection between a second terminal device and a UPF to a first terminal device, where the address information is used for the first terminal device to communicate with the second terminal device in a 3GPP network — 210

FIG. 3

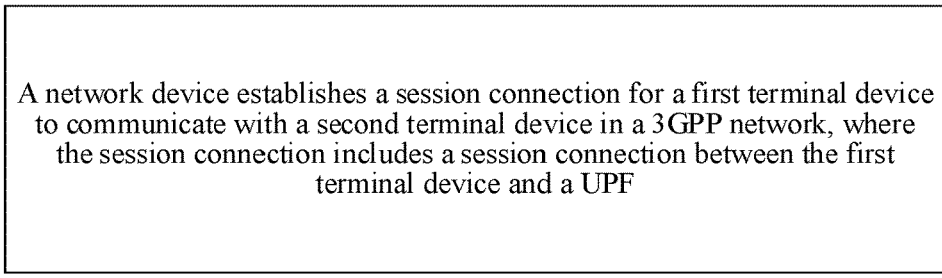

A network device establishes a session connection for a first terminal device to communicate with a second terminal device in a 3GPP network, where the session connection includes a session connection between the first terminal device and a UPF    310

FIG. 4

A first terminal device sends a data packet to a second terminal device, the data packet including address information of a session connection between the second terminal device and a UPF or address information of a session connection between the first terminal device and the UPF, where the session connection between the first terminal device and the UPF is dedicated to the first terminal device for communication with the second terminal device within a 3GPP network, and the address information of the session connection between the second terminal device and the UPF is used for the second terminal device for communication with other terminal devices within the 3GPP network    S610

FIG. 5

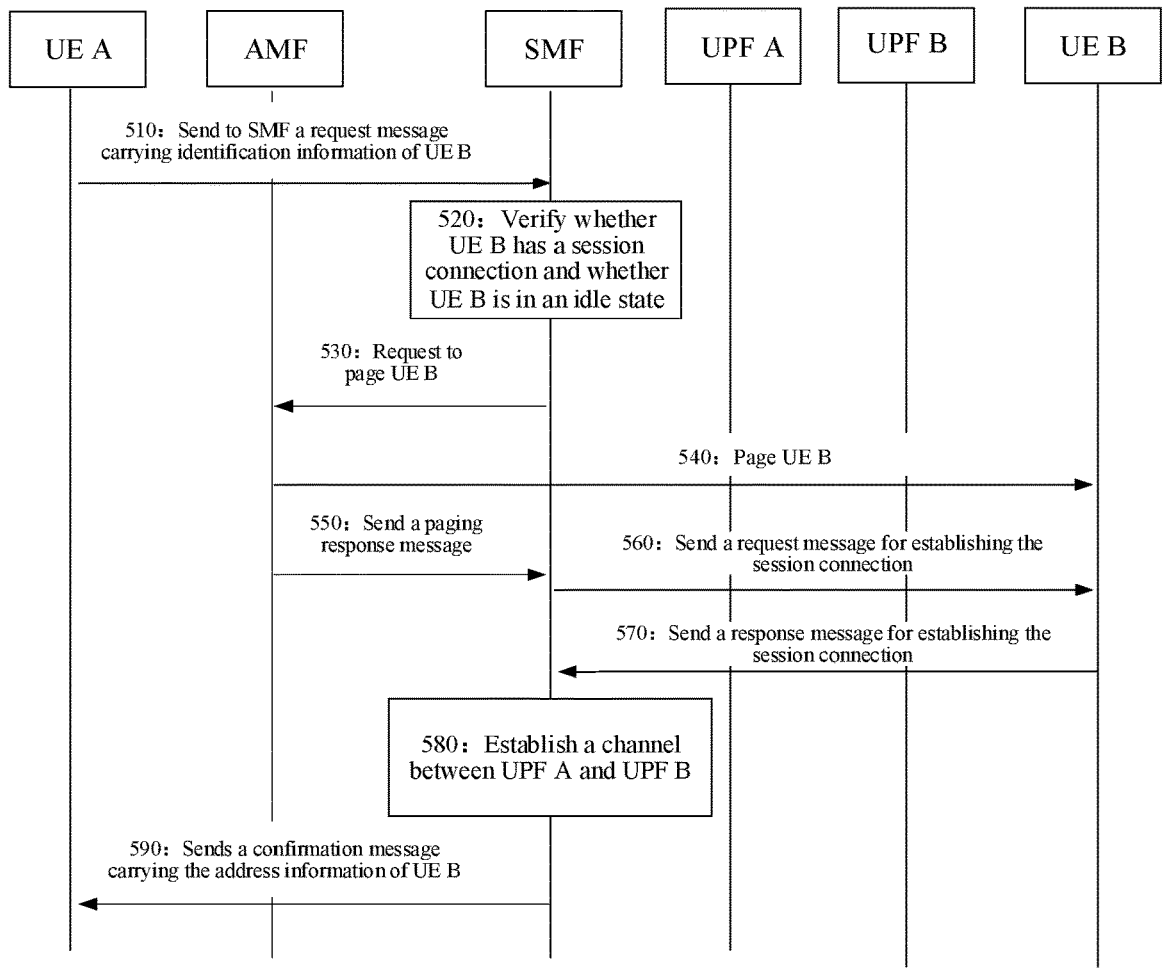

FIG. 6

WIRELESS COMMUNICATION METHOD AND COMMUNICATION DEVICE

CROSS-REFERENCE TO RELATED APPLICATION

This application is a continuation application of PCT Patent Application No. PCT/CN2018/103085, entitled "WIRELESS COMMUNICATION METHOD AND COMMUNICATION DEVICE" filed on Aug. 29, 2018, the disclosure of which is incorporated herein by reference in its entirety.

TECHNICAL FIELD

Embodiments of the present application relate to the field of communication technologies, and in particular to a wireless communication method and a communication device.

BACKGROUND

Currently, when a first terminal device sends a data packet to a second terminal device, the data packet sent by the first terminal device usually needs to pass through an access network, a core network, and an external server (e.g., a Domain Name System (DNS)) to arrive at the second terminal device.

In the process of sending the data packet, the data packet needs to not only pass through an internal network of a 3rd Generation Partnership Project (3GPP), but also to pass through an external server, for example, being subject to parsing and routing of the DNS.

SUMMARY

According to a first aspect, a wireless communication method is provided, including: receiving, by a network device, a data packet that is transmitted from a first terminal device through a control plane or a user plane within a 3rd Generation Partnership Project (3GPP) network; and sending, by the network device, the data packet to a second terminal device through the control plane or the user plane within the 3GPP network.

According to a second aspect, a wireless communication method is provided, including: sending, by a core network control plane entity to a first terminal device, address information of a session connection between a second terminal device and a User Plane Function (UPF), the address information being used for the first terminal device to communicate with the second terminal device within a 3rd Generation Partnership Project (3GPP) network.

According to a third aspect, a wireless communication method is provided, including: establishing, by a network device, a session connection for a first terminal device for communication with a second terminal device within a 3rd Generation Partnership Project (3GPP) network, wherein the session connection includes a session connection between the first terminal device and a User Plane Function (UPF).

According to a fourth aspect, a wireless communication method is provided, including: sending, by a first terminal device, a data packet to a second terminal device, the data packet including address information of a session connection between the second terminal device and a User Plane Function (UPF) or the address information of the session connection between the first terminal device and the UPF, wherein the session connection between the first terminal device and the UPF is dedicated to the first terminal device for communication with the second terminal device within a 3rd Generation Partnership Project (3GPP) network, and the address information of the session connection between the second terminal device and the UPF is used for the second terminal device for communication with other terminal devices within the 3GPP network.

According to a fifth aspect, there is provided a network device configured to perform the method in the above first aspect or implementations thereof.

Specifically, the network device includes a functional module configured to perform the method in the above first aspect or implementations thereof.

According to a sixth aspect, there is provided a core network control plane entity configured to perform the method in the above second aspect or implementations thereof.

Specifically, the core network control plane entity includes a functional module configured to perform the method in the above second aspect or implementations thereof.

According to a seventh aspect, there is provided a network device configured to perform the method in the above third aspect or implementations thereof.

Specifically, the network device includes a functional module configured to perform the method in the above third aspect or the implementations thereof.

According to an eighth aspect, there is provided a terminal device which is configured to perform the method in the above fourth aspect or the implementations thereof.

Specifically, the terminal device includes a functional module configured to perform the method in the above fourth aspect or the implementations thereof.

According to a ninth aspect, there is provided a network device including a processor and a memory. The memory is used for storing a computer program, and the processor is configured to revoke and run the computer program stored in the memory to perform the method in the above first aspect.

According to a tenth aspect, there is provided a core network control plane entity including a processor and a memory. The memory is used for storing a computer program, and the processor is configured to revoke and run the computer program stored in the memory to perform the method in the above second aspect.

According to a eleventh aspect, there is provided a network device including a processor and a memory. The memory is used for storing a computer program, and the processor is configured to revoke and run the computer program stored in the memory to perform the method in the above third aspect.

According to a twelfth aspect, there is provided a terminal device including a processor and a memory. The memory is used for storing a computer program, and the processor is configured to revoke and run the computer program stored in the memory to perform the method in the above fourth aspect.

According to a thirteenth aspect, there is provided a chip configured to carry out the method in any one of the above first to fourth aspects.

Specifically, the chip includes a processor configured to revoke and run a computer program from a memory, so that a device installed with the chip performs the method in any one of the above first to the fourth aspects.

According to an fourteenth aspect, there is provided a computer-readable storage medium for storing a computer program that cause a computer to carry out the method in any one of the above first to the fourth aspects.

According to a fifteenth aspect, there is provided a computer program product including computer program instructions that cause a computer to perform the method in any one of the above first to the fourth aspects.

According to a sixteenth aspect, there is provided a computer program which, when running on a computer, causes the computer to perform the method in any one of the above first to fourth aspects.

BRIEF DESCRIPTION OF THE DRAWINGS

FIG. 1 is a schematic diagram of a communication system architecture according to an embodiment of the present application.

FIG. 2 is a schematic diagram of a wireless communication method according to an embodiment of the present application.

FIG. 3 is a schematic diagram of a wireless communication method according to an embodiment of the present application.

FIG. 4 is a schematic diagram of a wireless communication method according to an embodiment of the present application.

FIG. 5 is a schematic diagram of a wireless communication method according to an embodiment of the present application.

FIG. 6 is a schematic diagram of a wireless communication method according to an embodiment of the present application.

DETAILED DESCRIPTION

Figure 7:
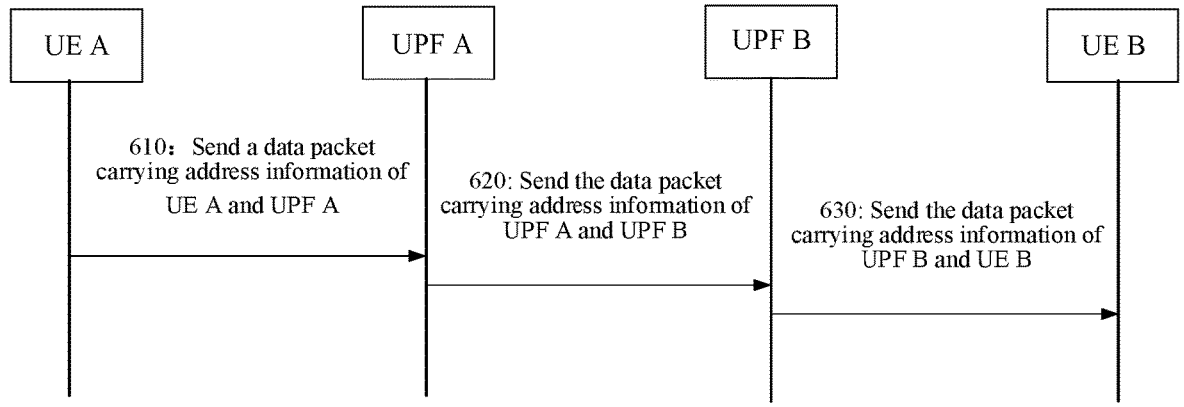
FIG. 7 is a schematic diagram of a wireless communication method according to an embodiment of the present application.

The technical solutions according to the embodiments of the present application will be described below in conjunction with the drawings in the embodiments of the present application. Obviously, the described embodiments are a part of embodiments of the present application, but not all the embodiments. Based on the embodiments in the present application, all other embodiments obtained by those of ordinary skill in the art without creative work fall within the protection scope of the present application.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

The technical solutions of the embodiments of the present application can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system, a 5G system, etc.

The terminal device mentioned in the embodiments of the present application includes, but is not limited to, a device configured to receive/send communication signals and/or an Internet of Things (IoT) device, which may be connected with another device via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter. A terminal device configured to communicate through a wireless interface may be referred to as a "wireless communication terminal", a "wireless terminal" or a "mobile terminal". Examples of the mobile terminal include but are not limited to satellite or cellular phones; Personal Communications System (PCS) terminals that can combine cellular radio phones with data processing, fax, and data communication capabilities; PDA that may include radio phones, pagers, Internet/intranet access, Web browser, memo pad, calendar, and/or Global Positioning System (GPS) receiver; and conventional laptop and/or palmtop receivers or other electronic devices including radio telephone transceivers. The terminal device may refer to access terminals, user equipment (UE), user units, user stations, mobile stations, mobile sites, remote stations, remote terminals, mobile equipment, user terminals, terminals, wireless communication equipment, user agents, or user device. The access terminal may be a cellular phone, a cordless phone, a Session Initiation Protocol (SIP) phone, a wireless local loop (WLL) station, a personal digital assistant (PDA), and wireless communication functional handheld devices, computing devices or other processing devices connected to wireless modems, in-vehicle devices, wearable devices, terminal devices in 5G networks, terminal devices in the future evolution of PLMN, or the like.

The network access device mentioned in the embodiments of the present application can be a device that communicates with a terminal device (or referred to as a communication terminal or a terminal). The network device can provide communication coverage for a specific geographic area, and can communicate with terminal devices located in the coverage area. In some embodiments, the network device 110 can be a Base Transceiver Station (BTS) in a GSM system or a CDMA system, a NodeB (NB) in a WCDMA system, an Evolutional Node B (eNB or eNodeB) in a LTE system, or a wireless controller in a Cloud Radio Access Network (CRAN). In some embodiments, the network device can be a mobile switching center, a relay station, an access point, an on-board device, a wearable device, a hub, a switch, a bridge, a router, a network side device in 5G network, a network device in future evolutional Public Land Mobile Network (PLMN), or the like.

The core network device mentioned in the embodiments of the present application may be a 5G core network device. For example, it can be an Access and Mobility Management Function (AMF), which is responsible for access and mobility management, and has functions such as authentication, handover, and location update of the user. For another example, it may be a Session Management Function (SMF), which is responsible for session management, including establishment, modification, and release of a packet data unit (PDU) session. For another example, it can be a User Plane Function (UPF), which is responsible for forwarding user data. The core network device may also be a core network device of a LTE system or other systems.

In some embodiments, the embodiments of the present application can be applied to a local network and a public land network.

The public land network may be a public land network based on PLMN.

The local network can also be called a local area network or a private network. The local network is usually arranged in office scenes, home scenes, and factories, and can realize more effective and safe management. There are usually local users or managers who deploy the local network. Generally, the users who are authorized to access have the access to the local network.

The local network can be managed or governed by the public land network, or it may not be managed or governed by the public land network.

In some embodiments, the local network may use an unlicensed frequency band for communication, or may also share a licensed frequency band with a public land network.

In some embodiments, the local network may be a network belonging to the category of 3GPP. A core network of the local network may be the core network of a NR technology or a LTE technology, and the local network can access the core network through an NR access network, an LTE access network or a Wireless Fidelity (Wi-Fi).

In some embodiments, in the embodiments of the present application, the public land network and the local network may share the core network while the access networks are independent; they may share the access network while the core networks are independent; they may share both the access network and core network; or they do not share either the access network or the core network. In a communication system, there is usually deployed a public network system, such as a network system based on a Public Land Mobile Network (PLMN). However, in the public network system, when a first terminal device communicates with a second terminal device, data packets need to not only pass through nodes inside the 3GPP network, but also be subject to parsing and routing of a DNS outside the 3GPP network so as to arrive at the second terminal device, and the communication delay is relatively long.

In view of this, the embodiments of the present application provide a point-to-point communication scheme, so that the data packets can arrive at the second terminal device by being routed only between the nodes within the 3GPP network during the sending process.

Internal transmission of the data within 3GPP can reduce transmission delay. The internal transmission means that the data is routed only between radio access networks (RAN) of the network nodes, AMF and/or SMF within the 3GPP, and is not subject to the parsing and routing process of the external DNS.

The embodiments of the present application can be applied to the public land mobile network, and can also be applied to the local network.

The public land network may be a public land network based on PLMN.

The local network can also be called a local area network or a private network. The local network is usually arranged in office scenes, home scenes, and factories, and can realize more effective and safe management. There are usually local users or managers who deploy the local network. Generally, the users who are authorized to access have the access to the local network.

The local network can be managed or governed by the public land network, or it may not be managed or governed by the public land network.

In some embodiments, the local network may use an unlicensed frequency band for communication, or may also share a licensed frequency band with the public land network.

In some embodiments, the local network may be a network belonging to the category of 3GPP and can include an access network and a core network. The core network of the local network may be the core network of the NR or LTE, and the local network can access the core network through an NR access network, an LTE access network or a Wireless Fidelity (Wi-Fi).

In some embodiments, in the embodiments of the present application, the public land network and the local network may share the core network while the access networks are independent; they may share the access network while the core networks are independent; they may share both the access network and the core network; or they may not share either the access network or the core network.

FIG. 1 is an architecture diagram of a point-to-point communication scheme according to an embodiment of the present application, which can reduce the transmission delay.

When the first terminal device sends a data packet to the second terminal device, the data packet can be routed only between nodes within the 3GPP network to arrive at the second terminal device.

For example, the data packet arrives at the second terminal device through only a user plane. The data packet sent by the first terminal device may arrive at the second terminal device through a first UPF and a second UPF.

For another example, the data packet may arrive at the second terminal device through a control plane. The first terminal device can first send the data packet to a SMF entity through the control plane, the SMF entity can route the data packet to the first UPF, the first UPF can send the data packet to the second UPF, and the second UPF in turn sends the data packet to the second terminal device.

FIG. 2 is a schematic diagram of a wireless communication method according to an embodiment of the present application. The method in FIG. 2 includes steps 110-120.

In S110, a network device receives a data packet which is transmitted from a first terminal device through a control plane or a user plane within a 3GPP network.

In some embodiments, the network device may be a core network device. For example, it may be the AMF, the SMF, the UPF, or the like.

The data packet transmitted through the control plane can be referred to as a control plane data packet, which can be, for example, the data packet transmitted through the AMF or the data packet transmitted through the SMF.

In S120, the network device sends the data packet to the second terminal device through the control plane or the user plane within the 3GPP network.

In the technical solution according to the embodiments of the present application, when the first terminal device sends the data packet to the second terminal device, the data packet is transmitted only between the nodes within the 3GPP network without passing through an external server, which reduces the number of times of the parse and encapsulation in the data transmission process, thereby reducing the delay.

In some embodiments, there is a first session connection between the first terminal device and the second terminal device, and the first session connection is used for communication between the first terminal device and the second terminal device.

The first session connection may be a dedicated session connection between the first terminal device and the second terminal device.

The first session connection is identified by at least one of an identity of the session connection, address information of a session between the first terminal device and the UPF of the first terminal device, address information of a session between the UPF of the first terminal device and the UPF of the second terminal device, and address information of a session between the second terminal device and the UPF of the second terminal device. For example, the first session connection may be identified by the identity of the session connection. For another example, the first session connection may be identified by the address information of the session between the first terminal device and the UPF of the first terminal device, the address information of the session between the UPF of the first terminal device and the UPF of the second terminal device, and the address information of the session between the second terminal device and the UPF of the second terminal device.

The first terminal device may send the data packet to the network device by using the first session connection. In a case that the data packet is the user plane data packet, the first terminal device sends the data packet to the network device through the user plane. The network device may be the UPF of the first terminal device or the UPF of the second terminal device. After receiving the data packet sent by the first terminal device, the network device may also use the first session connection to send the data packet to the second terminal device.

In some embodiments, the UPF of the first terminal device and the UPF of the second terminal device may be the same UPF. In the embodiments of the present application, the same UPF may be referred to as a first UPF.

The first terminal device may send the user plane data packet to the first UPF, where the data packet carries first address information of a connection between the first terminal device and the first UPF. After receiving the data packet, the first UPF can determine second address information from the first address information. The second address information can be the address information of a connection between the second terminal device and the first UPF in the first session connection.

Since the first session connection is the dedicated session connection between the first terminal device and the second terminal device, the first address information and the second address information have a unique correspondence, the first address information can be uniquely mapped to the second address information, and the second address information can also be uniquely mapped to the second address information.

The first address information carried in the data packet sent by the first terminal device can be used to indicate that the data packet is to be sent to the second terminal device.

In some embodiments, the correspondence between the first address information and the second address information may be pre-stored in the first UPF. The first UPF may determine the second address information by looking up for the correspondence according to the received first address information, and encapsulate the second address information in the data packet and send the data packet to the second terminal device.

In some embodiments, in some cases, if the UPF of the first terminal device is dedicated to the communication between the first terminal device and the second terminal device, the data packet may only carry the identification information of the first terminal device. When the data packet received by the UPF of the first terminal device carries the identity of the first terminal device, it can be determined that the data packet is to be sent to the second terminal device.

The identification information of the terminal device may refer to a temporary identity, a permanent identity or a device number of the terminal device. It should be understood that in the embodiments of the present application, the identification information of the terminal device may also be replaced by the address information of the terminal device, which can be, for example, an Internet Protocol (IP) address, a Medium Access Control (MAC) address of the terminal device, or the like.

For another example, the UPF of the first terminal device may not be dedicated to the communication with the second terminal device, and may also be used for communication with other terminal devices. However, the address information of the connection between the UPF of the first terminal device and the first terminal device may be dedicated to the communication with the second terminal device. When the data packet received by the UPF of the first terminal device carries the address information of the connection between the first terminal device and the UPF of the first terminal device, the UPF of the first terminal device can determine that the data packet is to be sent to the second terminal device.

In some embodiments, the UPF of the first terminal device and the UPF of the second terminal device may be different, and the first terminal device and the second terminal device may each have its own independent UPF.

It is assumed that the UPF of the first terminal device is a second UPF, and the UPF of the second terminal device is a third UPF.

In a case where the network device is the second UPF, the second UPF may receive the data packet sent by the first terminal device which carries third address information of a connection between the first terminal device and the second UPF. The second UPF may determine fourth address information from the third address information, where the fourth address information is address information of a connection between the second UPF and the third UPF.

The second UPF may encapsulate the fourth address information in the data packet, and send the data packet to the second terminal device through the third UPF.

In a case that the network device is the third UPF, the data packet received by the third UPF may carry the fourth address information, and the third UPF may uniquely determine fifth address information from the fourth address information, where the fifth address information is address information of a connection between the third UPF and the second terminal device.

The third UPF may encapsulate the fifth address information in the data packet, and send the data packet to the second terminal device.

In some embodiments, the network device may be a core network entity, for example, UPF, SMF, or AMF, and the core network entity may receive the data packet sent by the first terminal device through the control plane, and the data packet carries at least one piece of the following information: an identity of the first session connection, address information of the first session connection, the identification information of the first terminal device and the identification information of the second terminal device. The data packet can be sent to the core network entity through the control plane. The first session connection may be identified by at least one piece of the following information: an identity of the session connection, address information of the session between the first terminal device and the UPF of the first terminal device, the address information of the session between the UPF of the first terminal device and the UPF of the second terminal device, the address information of the session between the second terminal device and the UPF of the second terminal device.

The core network control plane entity may determine a next hop node of the data packet based on the above at least one piece of information carried by the data packet. The core network control plane entity can route the data packet to the next hop node through the control plane, so that the data packet is routed to the second terminal device by the next hop node.

In a case where the first session connection is established between the first terminal device and the second terminal device, the foregoing at least one piece of information may be associated with each other.

In a case where the session connection is established between the first terminal device and the second terminal device, the data packet sent to the second terminal device by the first terminal device can sequentially traverse the following nodes: the first terminal device, the AMF of the first terminal device, the SMF of the first terminal device, the UPF of the first terminal device, the UPF of the second terminal device, the SMF of the second terminal device, the AMF of the second terminal device, and the second terminal device; or the following nodes: the first terminal device, the AMF, the SMF, the UPF of the first terminal device, the UPF of the second terminal device, and the second terminal device. The access network device can serve a function of transparent transmission.

In some embodiments, the data packet sent by the first terminal device to the core network control plane entity may carry information of the second terminal device which may refer to the identification information of the second terminal device and/or the address information between the second terminal device and the UPF of the second terminal device. In this way, the core network control plane entity can determine the next hop node according to the information of the second terminal device, encapsulate the information of the second terminal device in the data packet, and send the data packet to the next hop node.

Moreover, in addition to carrying the information of the second terminal device, the data packet can also carry the information of the first terminal device. The information of the first terminal device may refer to the identification information of the first terminal device and/or the address information between the first terminal device and the UPF of the first terminal device. In this way, when receiving the data packet, the second terminal device can determine according to the information of the first terminal device in the data packet that a sender of the data packet is the first terminal device.

Alternatively, the data packet sent by the first terminal device to the core network may carry the information of the first terminal device and may not carry the information of the second terminal device.

When the information of the first terminal device is the address information between the first terminal device and the UPF corresponding to the first session connection, the network side may determine the next hop node based on this address information.

When the information of the first terminal device is the identification information of the first terminal device corresponding to the first session connection, the first terminal device can only establish a connection with one terminal device at one time. In some embodiments, if the network device establishes a new connection for the first terminal device, the previous connection state of the first terminal device recorded on the network device can be deleted, so that the first terminal device can only communicate with one terminal device at one time.

When the first terminal device sends the data packet to the network device, the data packet may carry the identity of the first terminal device. If the connection between the first terminal device and the second terminal device is currently established, the network device can determine that the data packet is to be sent to the second terminal device. The network device can encapsulate the address information of the first session connection in the data packet and send the data packet to the next hop node, or it can retain the identification information of the first terminal device in the data packet without encapsulating the identification information of the first session connection. Alternatively, the identification information of the first terminal device may be retained and the identification information of the first session connection may also be encapsulated in the data packet.

For example, assuming that the first terminal device encapsulates the identification information of the first terminal device into the data packet, in a case that the network device is the AMF, the AMF can determine the SMF serving the terminal device based on the identification information of the first terminal device, and send the data packet to the SMF. After receiving the data packet, the SMF can determine the UPF corresponding to the session connection of the first terminal device based on the identification information of the first terminal device in the data packet. In this case, there can be a correspondence between the identification information of the terminal device and the UPF stored on the SMF, and the SMF sends the data packet to the UPF of the first terminal device. If the UPF of the first terminal device is the same as the UPF of the second terminal device, the same UPF can look up for the address information between the UPF and the second terminal device based on the identification information of the first terminal device, and encapsulate the address information in the data packet and send the data packet to the second terminal device. Alternatively, the UPF can also look up for the identification information of the second terminal device based on the identification information of the first terminal device, determine the SMF serving the second terminal device, encapsulate the identification information of the second terminal device in the data packet, and send the data packet to the SMF. The SMF can determine the AMF based on the identification information of the second terminal device in the data packet, and the AMF can further send the data packet to the second terminal device.

In the above example, if the UPF of the first terminal device is different from the UPF of the second terminal device, the UPF of the first terminal device may obtain the address information between the UPF of the first terminal device and the UPF of the second terminal device corresponding to the first session connection based on the identification information of the first terminal device, encapsulate the address information into the data packet, and send the data packet to the UPF of the second terminal device. The UPF of the second terminal device may obtain the address information between the UPF of the second terminal device and the second terminal device corresponding to the first session connection based on the address information encapsulated in the data packet, encapsulate this address information in the data packet and send the data packet to the second terminal device. The UPF of the first terminal device can determine the UPF of the second terminal device based on the identification information of the first terminal device, and send the data packet to the UPF of the second terminal device. The UPF of the second terminal device can look up for the address information between the UPF of the second terminal device and the second terminal device, encapsulate this address information in the data packet and send the data packet to the second terminal device. It is also possible for the UPF of the first terminal device to look up for the identification information of the second terminal device based on the identification information of the first terminal device, determine the SMF serving the second terminal device, encapsulate the identification information of the second terminal device into the data packet, and send the data packet to the SMF. The SMF may determine the AMF based on the identification information of the second terminal device in the data packet, and the AMF can further send the data packet to the second terminal device.

In some embodiments, the data packet may carry an identity of the first session connection, and the network device may determine the next hop node of the session connection according to the connection identity. Further, the network device can determine the address information of the connection between the network device and the next hop, and encapsulate the address information in the data packet and send the data packet to the next hop node.

In some embodiments, the data packet may carry an identity of the second terminal device, and the network device may determine the next hop node according to the identity of the second terminal device. The network device may further determine the address information of a connection between the network device and the next hop, and the address information is associated with the second terminal device. The network device can encapsulate the address information in the data packet, and send the encapsulated data packet to the next hop node.

It can be seen from the above implementation that, since the first session connection has been established between the first terminal device and the second terminal device, the next hop node can be obtained according to the information of the first terminal device and/or the information of the second terminal device. The information encapsulated in each hop may be the same or different. For example, each hop encapsulates the identification information of the second terminal device. For another example, a previous hop encapsulates the identification information of the first terminal device, and the next hop encapsulates the identification information of the second terminal device, and the information encapsulated in the next hop may be obtained based on the information encapsulated in the previous hop.

In some embodiments, there are a second session connection between the first terminal device and the UPF, and a third session connection between the second terminal device and the UPF. The UPF of the first terminal device and the UPF of the second terminal device may be the same UPF, which is referred to as a fourth UPF.

In a case where the network device is the fourth UPF, the data packet sent by the first terminal device to the fourth UPF may carry address information of the third session connection and/or the identification information of the second terminal device.

The fourth UPF may send the data packet to the second terminal device through the user plane based on the address information of the third session connection and/or the identification information of the second terminal device.

Specifically, the fourth UPF may determine the address information of the third session connection based on the identification information of the second terminal device, encapsulate the address information of the third session connection in the data packet, and send the data packet to the second terminal device through the user plane.

The UPF of the first terminal device and the UPF of the second terminal device may be different UPFs, the UPF of the first terminal device may be referred to as a fifth UPF, and the UPF of the second terminal device may be referred to as a sixth UPF.

In a case where the network device is the fifth UPF, the data packet sent by the first terminal device to the fifth UPF may carry address information of the third session connection and/or the identification information of the second terminal device. The fifth UPF may determine the sixth UPF based on the address information of the third session connection and/or the identification information of the second terminal device, and send the data packet to the second terminal device through the sixth UPF.

In a case where the network device is the sixth UPF, the sixth UPF may receive the data packet sent by the first terminal device, which may carry the address information of the third session connection and/or the identification information of the second terminal device. It can be understood that the data packet sent by the first terminal device to the sixth UPF may be the data packet sent by the first terminal device to the sixth UPF through the fifth UPF.

The sixth UPF may send the data packet to the second terminal device through the user plane based on the address information of the third session connection and/or the identification information of the second terminal device.

In a case where the identification information of the second terminal device is carried in the data packet, the sixth UPF may determine the address information of the third session connection based on the identification information of the second terminal device. The sixth UPF may encapsulate an identity of the third session connection in the data packet and send the data packet to the second terminal device.

It should be noted that the identity of the third session connection encapsulated in the data packet by the first terminal device may be the one configured for the first terminal device by the network device.

In some embodiments, in a case where there are the second session connection and the third session connection described above, the data packet may also be sent to the second terminal device through the control plane.

The data packet sent by the first terminal device may carry at least one piece of the following information: an identity of the second session connection, the address information of the second session connection, an identity of the third session connection, the address information of the third session connection, the identification information of the first terminal device, and the identification information of the second terminal device.

For example, the data packet may carry information (for example, the identification or address information) of the second session connection or the identification information of the first terminal device, and carry information (for example, the identification or address information) of the third session connection or the identification information of the second terminal device. The network device can determine the next hop node based on the information of the third session connection or the identification information of the second terminal device, and the information of the second session connection or the identification information of the first terminal device can be encapsulated in the data packet and used in identifying the first terminal device and/or sending the data packet to the first terminal device by the second terminal device.

The network device may determine the next hop node of the data packet based on the at least one piece of information. The network device can send the data packet to the next hop node through the control plane, so that the data packet is sent to the second terminal device by the next hop node.

In some embodiments, the network nodes through which the data packet is routed may include the AMF of the first terminal device, the SMF of the first terminal device, the UPF of the first terminal device, the UPF of the second terminal device, and the second terminal device in this order; or may include the AMF of the first terminal device, the SMF of the first terminal device, the UPF of the first terminal device, the UPF of the second terminal device, the SMF of the second terminal device, the AMF of the second terminal device, and the second terminal device in this order, where the access network device can serve the function of transparent transmission.

The information encapsulated in each hop may be the same or different. For example, for the second session connection, each hop encapsulates the identification information of the second session connection, or the previous hop encapsulates the identification information of the second session connection, and the next hop encapsulates the address information of the second session connection.

In some embodiments, the network device may be a core network control plane entity, and the core network control plane entity receives the data packet sent by the first terminal device, which may carry identification information or address information of the first terminal device, for example, the IP address or MAC address of the terminal device. The core network control plane entity may send the data packet to the second terminal device through the control plane based on the identification information or address information of the first terminal device.

Specifically, the core network control plane entity may send the data packet to the second terminal device according to the identification information or address information of the first terminal device through the control plane when the second terminal device is in a connected state.

When the second terminal device is in an idle state, the core network control plane entity may send a paging message to the second terminal device to cause the second terminal device to transition from the idle state to the connected state.

In some embodiments, the core network control plane entity may be the SMF. The core network control plane entity sending the paging message to the second terminal device can be understood as that the SMF sends the paging message to the second terminal device through the AMF.

In some embodiments, when the second terminal device is in the idle state, the core network control plane entity may send the data packet to the second terminal device by using the paging message through the control plane according to the identification information or address information of the second terminal device.

Specifically, the core network control plane entity may send the data packet to the terminal device in a broadcast manner, and the data packet carries the identification information or address information of the second terminal device. After receiving the data packet, the second terminal device may determine that the data packet is sent thereto according to the identification information or address information carried in the data packet.

In addition, the data packet may also carry identification information or address information of the first terminal device, so that after receiving the data packet, the second terminal device can determine that the sender of the data packet is the first terminal device.

FIG. 3 shows another wireless communication method according to an embodiment of the present application. The method in FIG. 3 includes step 210. For the description of the relevant features of FIG. 3, reference may be made to the description of FIG. 2. In order to avoid repetition, details are not repeated here.

In S210, a core network control plane entity sends address information of a session connection between a second terminal device and a UPF to a first terminal device, where the address information is used for the first terminal device for communication with the second terminal device within a 3GPP network.

In the technical solutions according to the embodiments of the present application, after the session connection between the second terminal device and the UPF is established, the core network control plane entity may send the address information of the session connection between the second terminal device and the UPF to the first terminal device. In this way, in subsequent process of communication between the first terminal device and the second terminal device, the address information can be directly used in the communication, which can simplify the communication process.

After receiving the address information, the first terminal device may encapsulate the address information in the data packet sent to the second terminal device.

In addition, the core network control plane entity may send the address information of the session between the first terminal device and the UPF to the first terminal device.

The first terminal device may send the data packet to the UPF of the first terminal device through the user plane based on the address information of the session between the first terminal device and the UPF.

Similarly, the core network control plane entity may also send the address information of the session between the first terminal device and the UPF to the second terminal device. The core network control plane entity may also send address information of the session between the second terminal device and the UPF to the second terminal device.

The first terminal device may encapsulate the address information of the connection between the first terminal device and the UPF in the data packet, and send the data packet to the second terminal device. After receiving the data packet, the second terminal device can determine that a sender of the data packet is the first terminal device according to the address information.

In some embodiments, when the UPF of the first terminal device is different from the UPF of the second terminal device, the core network control plane entity may also establish a channel between the UPF of the first terminal device and the UPF of the second terminal device, which is used for the communication between the first terminal device and the second terminal device.

In some embodiments, the channel may be an IP channel or a General Packet Radio Service Tunneling Protocol (GTP-U) channel.

In some embodiments, the core network control plane entity may receive a service request message sent by the first terminal device, and the service request message may carry the identification information of the second terminal device. The identification information may be a temporary identity, a permanent identity, or a device number of the second terminal device.

The core network control plane entity may send a service confirmation message to the first terminal device in response to the service request message, and the service confirmation message may include the address information of the session between the second terminal device and the UPF.

In some embodiments, the core network control plane entity may receive a session establishment request message sent by the first terminal device, which carries the identification information of the second terminal device. The core network control plane entity may send a session establishment confirmation message to the first terminal device in response to the session establishment request message, and the session confirmation message includes the address information of the session between the second terminal device and the UPF.

When the session connection has not been established between the second terminal device and the UPF, the core network control plane entity may establish for the second terminal device a connection between the second terminal device and the UPF.

Specifically, the core network control plane entity may send to the second terminal device a request message for instructing the second terminal device to establish the connection with the UPF. The request message may carry the identification information of the first terminal device. After receiving the request message, the second terminal device can establish the connection with the UPF, and the connection can be used for the communication between the first terminal device and the second terminal device. In response to the request message, the second terminal device sends a connection establishment confirmation message to the core network control plane entity.

In some embodiments, when the second terminal device is in the idle state, prior to establishing the connection between the second terminal device and the UPF by the core network control plane entity for the second terminal device, the core network control plane entity may page the second terminal device.

In some embodiments, the core network control plane entity may also establish a connection between the first terminal device and the UPF for the first terminal device.

In some embodiments, when establishing the connection between the first terminal device and the UPF for the first terminal device, the core network control plane entity may select the UPF for the first terminal device.

Specifically, the core network control plane entity may use the UPF of the second terminal device as the UPF of the first terminal device, and establish a connection between the first terminal device and the UPF of the second terminal device for the first terminal device. In this case, the UPF of the first terminal device and the UPF of the second terminal device are the same UPF. Alternatively, the core network control plane entity may establish a connection between the first terminal device and the UPF of the first terminal device. In this case, the UPF of the first terminal device and the UPF of the second terminal device are not the same UPF. In addition, the core network control plane entity may also establish a connection channel between the UPF of the first terminal device and the UPF of the second terminal device.

In some embodiments, the core network control plane entity sends the address information of the session between the second terminal device and the UPF to the first terminal device, which may refer to triggering the network device to send the address information of the session between the second terminal device and the UPF to the first terminal device after the second terminal device establishes the session connection with the UPF.

Specifically, in the network system, whenever a terminal device establishes a session connection with the UPF, the core network control plane entity will send the address information of the session to other terminal devices to facilitate communication between the other terminal devices and this terminal device.

In some embodiments, the network device may send the address information of the session between the second terminal device and the UPF to the first terminal device in a broadcast manner, or send it to the first terminal device in a dedicated signaling manner.

In this manner, the first terminal device is not required to request the network device for the address information of the connection between the second terminal device and the UPF, rather, the network device actively sends this information to the first terminal device, which can further reduce the delay of the communication process.

In some embodiments, the address information of the session between the terminal device and the UPF may be an IP address, a MAC address, or a Tunnel Endpoint Identity (TEID).

FIG. 4 is a schematic diagram of another wireless communication method according to an embodiment of the present application. The method of FIG. 4 includes step 310.

In S310, a network device establishes a session connection for a first terminal device for communication with a second terminal device within a 3GPP network, where the session connection includes a session connection between the first terminal device and a UPF.

According to the technical solutions according to the embodiments of the present application, the network device can establish a dedicated session connection for the first terminal device for communication with the second terminal device, and the session connection can be used for the communication between the first terminal device and the second terminal device within the 3GPP network, which can reduce the communication delay.

In some embodiments, the connection established by the network device for the first terminal device may be a connection dedicated to communication with the second terminal device.

Specifically, the network device may assign address information dedicated to communication with the second terminal device to the first terminal device, where the address information is address information of the session connection between the first terminal device and the UPF.

For example, the first terminal device may encapsulate the dedicated address information in the data packet and send the data packet to the UPF. After receiving the data packet, the UPF can determine according to the address information that the data packet is to be sent to the second terminal device.

In some embodiments, the network device may receive a session establishment request message sent by the first terminal device, which carries identification information of the second terminal device. The network device may establish for the first terminal device a session connection for communication between the first terminal device and the second terminal device in response to the session establishment request message.

The session connection between the second terminal device and the UPF may be a shared session connection, or may be dedicated to the first terminal device.

In some embodiments, when the second terminal device has established the shared session connection with the UPF, the network device may establish for the first terminal device the session connection for the communication between the first terminal device and the second terminal device based on the shared session connection.

In a case that the session connection between the second terminal device and the UPF belongs to the shared session connection, the network device can establish an association relationship between address information of the session connection between the first terminal device and the second terminal device and address information of the shared session connection on the UPF of the first terminal device.

The shared session connection may refer to the one through which the second terminal device can communicate with a plurality of terminal devices.

In a case that the session connection between the second terminal device and the UPF is dedicated to the first terminal device, when sending the data packet to the first terminal device, the second terminal device can encapsulate the address information of the session between the second terminal device and the UPF in the data packet. In this way, after receiving the data packet, the first terminal device determines that the sender of the data packet is the second terminal device according to the address information of the session between the second terminal device and the UPF.

In some embodiments, when the second terminal device is in the idle state, the network device may also page the second terminal device to trigger the second terminal device to send a session connection establishment request.

The network device may be the SMF, and the SMF pages the second terminal device, or the SMF may page the second terminal device through the AMF.

In some embodiments, when the network device establishes the session connection for the first terminal device for communication with the second terminal device in the 3GPP network, the network device may select the same UPF for the first terminal device as that for the second terminal device, and establish a session connection between the first terminal device and the same UPF.

When the UPF of the first terminal device is different from the UPF of the second terminal device, the network device may also establish a connection between the UPF of the first terminal device and the UPF of the second terminal device.

FIG. 5 is a schematic diagram of another wireless communication method according to an embodiment of the present application. The method of FIG. 5 includes step 410.

In S410, a first terminal device sends a data packet to a second terminal device, the data packet including address information of a session connection between the second terminal device and a UPF or address information of a session connection between the first terminal device and the UPF, where the session connection between the first terminal device and the UPF is dedicated to the first terminal device for communication with the second terminal device within a 3GPP network, and the address information of the session connection between the second terminal device and the UPF is used for the second terminal device for communication with other terminal devices within the 3GPP network.

The session connection between the first terminal device and the UPF is dedicated to the first terminal device for the communication with the second terminal device in the 3GPP network, which indicates that the UPF can determine based on the dedicated address information that the data packet is to be sent to the second terminal device.

In the technical solutions according to the embodiments of the present application, the first terminal device and the second terminal device can communicate within the 3GPP network without subject to parsing and encapsulating process by an external server, which can reduce time delay. In addition, the address information of the session connection between the first terminal device and the UPF is dedicated to the communication between the first terminal device and the second terminal device within the 3GPP network, and the network device can directly route the data packet to the second terminal device according to the address information without encapsulating other additional information in the data packet, which can simplify the communication process.

In some embodiments, prior to sending the data packet to the second terminal device, the first terminal device may also receive the address information of the session connection between the second terminal device and the UPF or the address information of the session connection between the first terminal device and the UPF sent by the network device.

The first terminal device may encapsulate the address information of the session connection between the second terminal device and the UPF in the data packet, and send the data packet to the second terminal device. In this way, the network nodes through which the data packet passes in the routing process can determine that a recipient of the data packet is the second terminal device according to the address information of the session connection between the second terminal device and the UPF, and send the data packet to the second terminal device.

The first terminal device may also encapsulate the address information of the session connection between the first terminal device and the UPF in the data packet, and send the data packet to the second terminal device. Since the address information of the session connection between the first terminal device and the UPF is dedicated to the second terminal device, the network nodes through which the data packet passes in the routing process can determine that the recipient of the data packet is the second terminal device based on the address information of the session connection between the first terminal device and the UPF, and send the data packet to the second terminal device.

In some embodiments, the address information of the session connection between the second terminal device and the UPF may be carried in broadcast information or dedicated signaling.

For example, the first terminal device may receive the address information of the session connection between the second terminal device and the UPF sent by the network device through the broadcast information, or the first terminal device may receive the address information of the session connection between the second terminal device and the UPF sent by the network device through the dedicated signaling. The dedicated signaling may be, for example, RRC signaling.

FIG. 6 is a schematic diagram of a method for establishing a session connection between UE A and UE B according to an embodiment of the present application.

In step 510, UE A sends to a SMF a request message, which carries identification information of UE B, to request establishing a connection between UE A and UE B. The request message may be a session establishment request message or a service request message.

In step 520, after receiving the request message, the SMF verifies whether UE B has established a session connection with UPF B or not.

When UE B has the session connection with UPF B, and UE B is in a connected state, the method proceeds to step 590 directly.

When UE B has the session connection with UPF B and is in an idle state, the method proceeds to step 540.

When the UE B does not have the session connection with the UPF B, step 530 is performed.

In Step 530, the SMF requests an AMF to page UE B.

In Step 540, the AMF pages UE B.

In step 550, when successfully paging UE B, the AMF sends a paging response message to the SMF.

When UE B transitions from the idle state to the connected state, and has the session connection with UPF B, the method proceeds directly to step 590.

When the UE B transitions from the idle state to the connected state, and does not have the session connection with the UPF B, step 560 is performed.

In step 560, the SMF sends a request message for establishing the session connection to UE B, where the request message carries identification information of UE A.

In step 570, UE B establishes the session connection with the PDU in response to the request message for establishing the session connection.

In step 580, the SMF establishes a channel between UPF A and UPF B. This channel connects the respective session connections of UE A and UE B.

In step 590, the SMF sends to UE A a confirmation message which carries the address information of UE B.

In the scheme shown in FIG. 6, the network device can establish the session connection between the first terminal device and the second terminal device, including the connection between UE A and UPF A, the connection between UE B and UPF B, and the connection between UPF A and UPF B. This session connection can be used for the communication between the first terminal device and the second terminal device within the 3GPP network, which is beneficial to reduce the transmission delay.

FIG. 7 is a schematic diagram of a specific wireless communication method according to an embodiment of the present application.

The method in FIG. 7 shows a process in which UE A sends a data packet to UE B through a user plane, where a connection established between UE A and UPF A is dedicated to communication with UE B, the connection established between UE B and UPF B is also dedicated to the communication with UE B, and the connection established between UPF A and UPF B is dedicated to the communication between UE A and UE B.

The connection between UE A and UE B can be a first session connection which can include address information of the session between UE A and UPF A, address information of the connection between UPF A and UPF B, and address information of the session between UE B and UPF B.

These pieces of address information included in the first session connection can be associated with each other. For example, according to one piece of the address information, the other two pieces of address information can be uniquely determined.

In some embodiments, the first session connection may further include identification information of the first session connection, and the address information of the above three connections can also be uniquely determined from the identification information.

A description will be given below in an example in which the address information of the session between UE A and UPF A is carried in the data packet.

In step 610, UE A sends a data packet to UPF A, where the data packet carries address information of a session between UE A and UPF A.

In step 620, after receiving the data packet, UPF A can determine address information of a connection between UPF A and UPF B according to the address information of the session between UE A and UPF A. UPF A can encapsulate the address information of the connection between UPF A and UPF B in the data packet, and send the data packet to UPF B.

In step 630, after receiving the data packet, UPF B can determine address information of a session between UPF B and UE B according to the address information of the connection between UPF A and UPF B carried in the data packet. UPF B can encapsulate the address information of the session between UPF B and UE B in the data packet and send the data packet to UE B.

Figure 8:
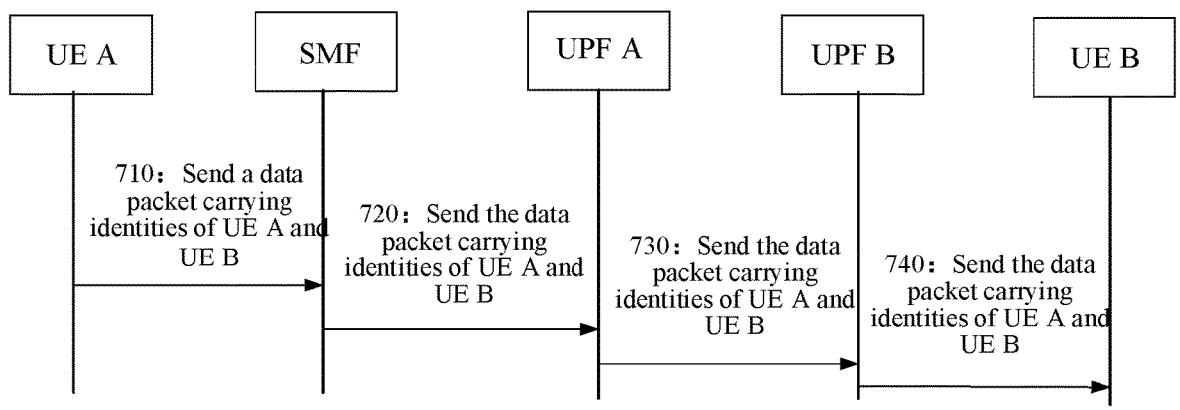
FIG. 8 is a schematic diagram of a wireless communication method according to an embodiment of the present application.

FIG. 8 is a schematic diagram of another wireless communication method according to an embodiment of the present application. The method in FIG. 8 shows a process in which UE A send a data packet to UE B through a control plane.

The address information between adjacent nodes in FIG. 8 is associated with each other, and a dedicated first session connection is established between UE A and UE B.

In step 710, UE A encapsulates the data packet to be sent into a control plane data packet, and sends the data packet to an AMF. The data packet may carry at least one piece of information of: an identity of a first session connection, address information of the first session connection, identification information of UE A, and identification information of UE B.

The control plane data packet may be a Network Attached Storage (NAS) PDU.

The address information of the first session connection includes the address information of a connection between UE A and the SMF, the address information of a connection between the SMF and UPF A, the address information of a connection between UPF A and UPF B, and the address information of a connection between UPF B and UE B.

These pieces of address information included in the first session connection are associated with each other, and according to one piece of address information, the other pieces of address information can be uniquely determined.

In step 720, after receiving the data packet, the AMF can decapsulate the data packet, and determine that a next hop node is UPF A according to at least one piece of information carried in the data packet. The AMF can encapsulate the data packet and send it to UPF A. The data packet can carry the identification information of UE A and UE B.

In step 730, after receiving the data packet, UPF A may decapsulate the data packet, and determine that the next hop node is UPF B according to the at least one piece of information. UPF A can encapsulate the data packet and send the data packet to UPF B. The data packet can carry the identification information of UE A and UE B.

In step 740, after receiving the data packet, UPF B can decapsulate the data packet, and determine that the next hop node is UE B according to the at least one piece of information. UPF B can encapsulate the data packet and send the data packet to UE B. The data packet can carry the identification information of UE A and UE B.

After receiving the data packet, UE B can determine that the sender of the data packet is UE A according to the at least one piece of information.

When sending a data packet to UE A, UE B can also send the data packet to UE A by using the routing scheme shown in FIG. 8.

In the method shown in FIG. 8, UPF A and UPF B may also be the same UPF. The AMF can send the data packet to the same UPF which sends the data packet to UE B.

Figure 9:
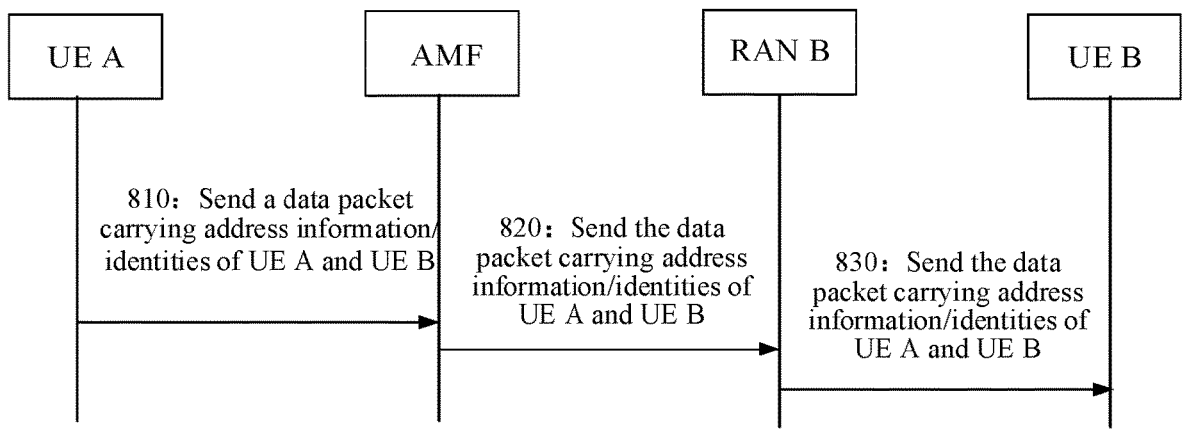
FIG. 9 is a schematic diagram of a wireless communication method according to an embodiment of the present application.

FIG. 9 is a schematic diagram of another wireless communication method according to an embodiment of the present application.

The method in FIG. 9 shows that the data packet sent by UE A is routed to UE B by way of direct routing by the network device.

In some embodiments, the network device may be the AMF.

In step 810, UE A sends a data packet to the AMF, and the data packet carries an address or identity of UE A and the address or identity of UE B.

The data packet is a control plane data packet. For example, the data packet may be a NAS PDU.

In step 820, after receiving the data packet, the AMF decapsulates the data packet to obtain the address or identification information of UE B, and selects an access network of UE B according to the address or identification information of UE B.

The AMF encapsulates the data packet, and sends the encapsulated data packet to the access network of UE B, where the encapsulated data packet carries the address or identity of UE A, and the address or identity of UE B.

In step 830, after receiving the data packet, the access network of UE B determines that the next hop node is UE B according to the address or identity of UE B in the data packet, and sends the data packet to UE B.

After receiving the data packet, UE B can decapsulate the data packet to obtain the address or identity of UE A, thereby determining that the sender of the data packet is UE A. UE B may send a data packet to UE A based on the address or identity of UE A.

In some embodiments, the AMF can send the data packet to UE B by way of broadcasting or by way of dedicated signaling.

When UE B is in the idle state, the AMF can send the data packet to UE B through broadcasting. After UE B receives the data packet, it can determine that the data packet is sent to itself according to the address or identity of UE B carried in the data packet.

When UE B is in the idle state, the AMF can page UE B to cause UE B to transition from the idle state to the connected state. In this case, the AMF can send the data packet to UE B through the dedicated signaling.

Of course, regardless of whether UE B is in the connected state or in the idle state, the AMF can send the data packet to UE B through broadcasting.

The wireless communication methods have been described above with reference to FIGS. 1 to 8. Devices according to the embodiments of the present application will be described below in conjunction with FIG. 10 to FIG. 16, and the technical features described in the method embodiments apply to the following device embodiments.

Figure 10:
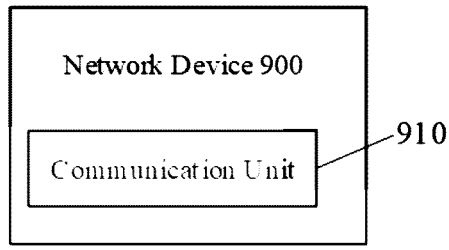
FIG. 10 is a schematic block diagram of a network device according to an embodiment of the present application.

FIG. 10 is a schematic block diagram of a network device 900 according to an embodiment of the present application. As shown in FIG. 10, the network device 900 includes a communication unit 910 configured to: receive a data packet which is transmitted from a first terminal device through a control plane or a user plane within a 3rd Generation Partnership Project (3GPP) network, and to send the data packet to a second terminal device through the control plane or the user plane within the 3GPP network.

In some embodiments, there is a first session connection between the first terminal device and the second terminal device, and the first session connection is used for communication between the first terminal device and the second terminal device. The data packet is sent to the network device 800 through the user plane via the first session connection. The communication unit 910 is further configured to send the data packet to the second terminal device by using the first session connection through the user plane in the 3GPP network.

In some embodiments, a User Plane Function (UPF) of the first terminal device and the UPF of the second terminal device are a same first UPF, and the network device 900 is the first UPF.

In some embodiments, the data packet received by the network device 900 carries first address information of a connection between the first terminal device and the first UPF in the first session connection; the network device 900 further includes a processing unit configured to determine second address information based on the first address information. The second address information is the address information of a connection between the second terminal device and the first UPF in the first session connection. The communication unit 910 is further configured to encapsulate the second address information in the data packet and send the data packet to the second terminal device.

In some embodiments, the UPF of the first terminal device is a second UPF, the UPF of the second terminal device is a third UPF other than the second UPF, and the network device 900 is the second UPF.

In some embodiments, the data packet received by the network device 900 carries third address information of a connection between the first terminal device and the second UPF in the first session connection; the processing unit is further configured to: determine fourth address information based on the third address information, where the fourth address information is the fourth address information of a connection between the second UPF and the third UPF in the first session connection; and the communication unit 910 is further configured to encapsulate the fourth address information in the data packet and send the data packet to the second terminal device through the third UPF.

In some embodiments, the UPF of the first terminal device is a second UPF, the UPF of the second terminal device is a third UPF other than the second UPF, and the network device 900 is the third UPF.

In some embodiments, the data packet received by the network device 900 carries fourth address information of a connection between the second UPF and the third UPF in the first session connection; the processing unit is further configured to determine fifth address information based on the fourth address information, where the fifth address information is address information of a connection between the third UPF and the second terminal device in the first session connection; the communication unit 910 is further configured to encapsulate the fifth address information in the data packet and send the data packet to the second terminal device.

In some embodiments, the network device 900 is a core network entity, and the data packet carries at least one piece of information of: an identity of the first session connection, address information of the first session connection, identification information of the first terminal device and identification information of the second terminal device, the data packet is sent to the network device 900 through the control plane, the processing unit is further configured to: determine a next hop node of the data packet based on the at least one piece of information, and the communication unit 910 is further configured to send the data packet to the next hop node through the control plane, so that the data packet is sent to the second terminal device by the next hop node.

In some embodiments, there are a second session connection between the first terminal device and the UPF, and a third session connection between the second terminal device and the UPF. The UPF of the first terminal device and the UPF of the second terminal device are a same fourth UPF, and the network device 900 is the fourth UPF.

In some embodiments, the data packet carries address information of the third session connection and/or identification information of the second terminal device, and the communication unit 910 is further configured to send the data packet to the second terminal device through the user plane based on the address information of the third session connection and/or the identification information of the second terminal device.

In some embodiments, the processing unit is further configured to determine the address information of the third session connection based on the identification information of the second terminal device, and the communication unit 910 is further configured such that the network device 900 encapsulates the address information of the third session connection in the data packet and sends the data packet to the second terminal device.

In some embodiments, there are a second session connection between the first terminal device and the UPF and a third session connection between the second terminal device and the UPF. The UPF of the first terminal device is a fifth UPF, the UPF of the second terminal device is a sixth UPF other than the fifth UPF, and the network device 900 is the fifth UPF.

In some embodiments, the data packet carries address information of the third session connection, and/or identification information of the second terminal device, the processing unit is further configured to determine the sixth UPF based on the address information of the third session connection and/or the identification information of the second terminal device, and the communication unit 910 is further configured to send the data packet to the second terminal device through the sixth UPF.

In some embodiments, there are a second session connection between the first terminal device and the UPF and a third session connection between the second terminal device and the UPF. The UPF of the first terminal device is a fifth UPF, the UPF of the second terminal device is a sixth UPF other than the fifth UPF, and the network device 900 is the sixth UPF.

In some embodiments, the data packet carries address information of the third session connection or the identification information of the second terminal device, and the communication unit 910 is further configured to send the data packet to the second terminal device through the user plane based on the address information of the third session connection or the identification information of the second terminal device.

In some embodiments, the processing unit is further configured to determine the address information of the third session connection based on the identification information of the second terminal device, and the communication unit 910 is further configured to encapsulate the address information of the third session connection in the data packet, and send the data packet to the second terminal device.

In some embodiments, there are a second session connection between the first terminal device and the UPF and a third session connection between the second terminal device and the UPF. The data packet carries at least one piece of information of: an identity of the second session connection, address information of the second session connection, an identity of the third session connection, address information of the third session connection, identification information of the first terminal device, and identification information of the second terminal device. The data packet is sent to the network device 900 through the control plane. The processing unit is further configured to determine a next hop node of the data packet based on the at least one piece of information, and the communication unit 910 is further configured to send the data packet to the next hop node through the control plane, so that the data packet is sent to the second terminal device by the next hop node.

In some embodiments, the network device 900 is a core network control plane entity, and the data packet received by the network device 900 carries identification information or address information of the second terminal device. The communication unit 910 is further configured to send the data packet to the second terminal device based on the identification information or address information of the terminal device through the control plane.

In some embodiments, the communication unit 910 is further configured to send the data packet to the second terminal device according to the identification information or address information of the second terminal device through the control plane when the second terminal device is in a connected state.

In some embodiments, the communication unit 910 is further configured to send a paging message to the second terminal device if the second terminal device is in an idle state, to cause the second terminal device to transition from the idle state to the connected state.

In some embodiments, the communication unit 910 is further configured to send the data packet to the second terminal device according to the identification information or address information of the second terminal device through the control plane by using a paging message when the second terminal device is in the idle state.

It should be understood that the network device 900 may correspond to the network device shown in FIG. 2 and can carry out corresponding operations implemented by the network device shown in FIG. 2, which will not be described herein again for the sake of brevity.

Figure 11:
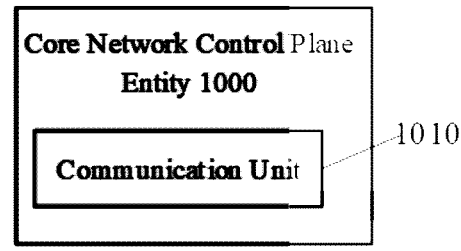
FIG. 11 is a schematic block diagram of a core network control plane entity according to an embodiment of the present application.

FIG. 11 is a schematic block diagram of a core network control plane entity 1000 according to an embodiment of the present application. The core network control plane entity 1000 includes a communication unit 1010.

The communication unit 1010 is configured to send address information of a session connection between a second terminal device and a UPF to a first terminal device, where the address information is used for the first terminal device for communication with the second terminal device within a 3GPP network.

In some embodiments, the communication unit 1010 is further configured to send address information of a session between the first terminal device and the UPF to the second terminal device.

In some embodiments, the core network control plane entity 1000 further includes a processing unit configured to: establish, when the UPF of the first terminal device is different from the UPF of the second terminal device, a channel between the UPF of the first terminal device and the UPF of the second terminal device for the communication between the first terminal device and the second terminal device.

In some embodiments, the channel is an IP channel or a General Packet Radio Service Tunneling Protocol (GTP-U) channel.

In some embodiments, the communication unit 1010 is further configured to receive a service request message sent by the first terminal device, where the service request message carries identification information of the second terminal device; and in response to the service request message, send address information of a session between the second terminal device and the UPF to the first terminal device through a service confirmation message.

In some embodiments, the communication unit 1010 is further configured to receive a session establishment request message sent by the first terminal device, where the session establishment request message carries identification information of the second terminal device; and in response to the session establishment request message, send the address information of the session between the second terminal device and the UPF to the first terminal device through a session establishment confirmation message.

In some embodiments, the core network control plane entity 1000 further includes a processing unit configured to establish for the second terminal device a connection between the second terminal device and the UPF when the second terminal device has not established a session with the UPF.

In some embodiments, the communication unit 1010 is further configured to page the second terminal device.

In some embodiments, the core network control plane entity 1000 further includes a processing unit configured to establish for the first terminal device a connection between the first terminal device and the UPF.

In some embodiments, when the processing unit establishes the connection between the first terminal device and the UPF, the UPF selected for the first terminal device is the same as the UPF of the second terminal device.

In some embodiments, the communication unit 1010 is further configured to send address information of the session between the second terminal device and the UPF to the first terminal device after the session between the second terminal device and the UPF is established.

In some embodiments, the address information is carried in a broadcast message or dedicated signaling.

In some embodiments, the address information is an IP address, a Media Access Control (MAC) address or a Tunnel Endpoint Identity (TEID).

It should be understood that the core network control plane entity 1000 may correspond to the core network control plane entity shown in FIG. 3, and can carry out the corresponding operations implemented by the core network control plane entity shown in FIG. 3, which will not be not repeated here for the sake of brevity.

Figure 12:
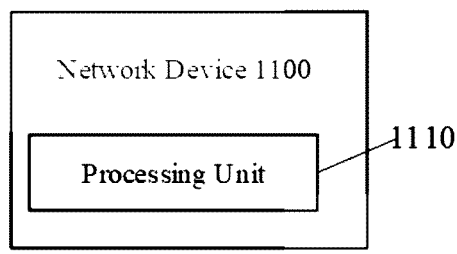
FIG. 12 is a schematic block diagram of a network device according to an embodiment of the present application.

FIG. 12 is a schematic block diagram of a network device 1100 according to an embodiment of the present application. The network device 1100 includes a processing unit 1110 configured to establish a session connection for a first terminal device for communication with a second terminal device within a 3rd Generation Partnership Project (3GPP) network, where the session connection includes a session connection between the first terminal device and a User Plane Function (UPF).

In some embodiments, the processing unit 1110 is further configured to assign address information dedicated to communication with the second terminal device to the first terminal device, where the address information is the address information of the session connection between the first terminal device and the UPF.

In some embodiments, the network device 1100 further includes a communication unit configured to receive a session establishment request sent by the first terminal device, where the session establishment request carries identification information of the second terminal device, and the processing unit 1110 is further configured to establish the session connection for the first terminal device for the communication with the second terminal device in response to the session establishment request.

In some embodiments, the processing unit 1110 is further configured to establish, when the second terminal device has established a shared session connection with the UPF, the session connection for the first terminal device for the communication with the second terminal device based on the shared session connection.

In some embodiments, the processing unit 1110 is further configured to establish an association relationship between address information of the session connection for the first terminal device for the communication with the second terminal device and address information of the shared session connection on the UPF of the first terminal device.

In some embodiments, the processing unit 1110 is further configured to establish a second session connection for the second terminal device, the second session connection is a session connection between the second terminal device and the UPF and is used for the second terminal device to communicate with the first terminal device.

In some embodiments, the network device 1000 further includes a communication unit configured to page the second terminal device to trigger the second terminal device to send a session connection establishment request when the second terminal device is in an idle state.

In some embodiments, the processing unit 1110 is further configured to select a same UPF for the first terminal device as that for the second terminal device.

In some embodiments, the processing unit 1110 is further configured to establish, when the UPF of the first terminal device is different from the UPF of the second terminal device, a connection between the UPF of the first terminal device and the UPF of the second terminal device.

It should be understood that the network device 1100 may correspond to the network device shown in FIG. 4 and can carry out corresponding operations implemented by the network device shown in FIG. 4, which will not be described herein again for the sake of brevity.

Figure 13:
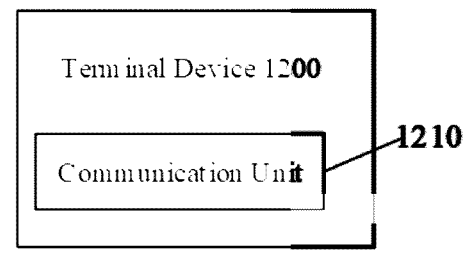
FIG. 13 is a schematic block diagram of a network device according to an embodiment of the present application.

FIG. 13 is a schematic block diagram of a terminal device 1200 according to an embodiment of the present application. The terminal device 1200 includes a communication unit 1210 configured to send a data packet to a second terminal device, the data packet including address information of a session connection between the second terminal device and a User Plane Function (UPF) or address information of a session connection between a first terminal device and the UPF, where the session connection between the first terminal device and the UPF is dedicated to the first terminal device for communication with the second terminal device within a 3rd Generation Partnership Project (3GPP) network, and the session connection between the second terminal device and the UPF is used for the second terminal device for communication with other terminal devices within the 3GPP network.

In some embodiments, the communication unit 1210 is further configured to receive the address information of the session connection between the second terminal device and the UPF or the address information of the session connection between the first terminal device and the UPF sent by the network device.

In some embodiments, the address information of the session connection between the second terminal device and the UPF is carried in broadcast information or dedicated signaling.

It should be understood that the terminal device 1200 can correspond to the first terminal device shown in FIG. 5, and can carry out corresponding operations implemented by the first terminal device shown in FIG. 5, which will not be repeated here for the sake of brevity.

Figure 14:
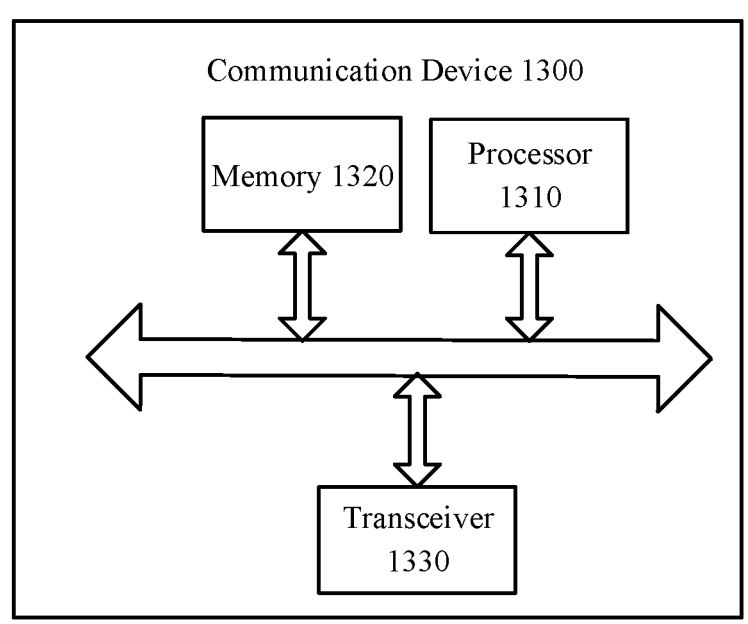
FIG. 14 is a schematic structural diagram of a communication device according to an embodiment of the present application.

FIG. 14 is a schematic structural diagram of a communication device 1300 according to an embodiment of the present application. The communication device 1300 includes a processor 1310 which can call and run a computer program from the memory to carry out the methods in the embodiments of the present application.

In some embodiments, as shown in FIG. 14, the communication device 1300 can further include a memory 1320. The processor 1310 can invoke and run the computer program from the memory 1320 to carry out the methods in the embodiments of the present application.

The memory 1320 may be a separate device independent of the processor 1310, or may be integrated in the processor 1310.

In some embodiments, as shown in FIG. 14, the communication device 1300 may further include a transceiver 1330, and the processor 1310 may control the transceiver 1330 to communicate with other devices, and specifically, to send information or data to the other devices or receive information or data sent by the other devices. The transceiver 1330 may include a transmitter and a receiver. The transceiver 1330 may further include an antenna, and the number of antennas may be one or more.

In some embodiments, the communication device 1300 can be a terminal device in the embodiments of the present application, and can carry out the corresponding processes which are implemented by the terminal device in the methods of the embodiments of the present application, which will not be repeated here for the sake of brevity.

In some embodiments, the communication device 1300 can be a network device in the embodiments of the application, and can specifically be a core network control plane entity (for example, AMF, SMF, UPF, etc.), and can carry out corresponding process implemented by the terminal device in the methods in the embodiments of the present application, which will not be repeated here for the sake of brevity.

Figure 15:
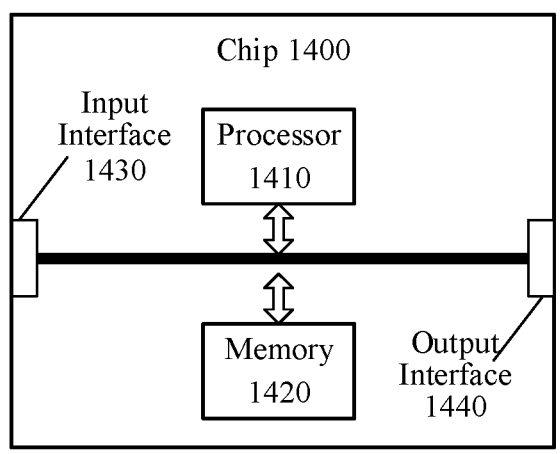
FIG. 15 is a schematic structural diagram of a system chip according to an embodiment of the present application.

FIG. 15 is a schematic structural diagram of a chip according to an embodiment of the present application. The chip 1400 shown in FIG. 15 includes a processor 1410 which can invoke and run a computer program from a memory to carry out the methods in the embodiments of the present application.

In some embodiments, as shown in FIG. 15, the chip 1400 can further include a memory 1420. The processor 1410 can invoke and run the computer program from the memory 1420 to carry out the methods in the embodiments of the present application.

The memory 1420 may be a separate device independent of the processor 1410, or may be integrated in the processor 1410.

In some embodiments, the chip 1400 can further include an input interface 1430. The processor 1410 can control the input interface 1430 to communicate with other devices or chips, and particularly to obtain information or data transmitted by other devices or chips.

In some embodiments, the chip 1400 can further include an output interface 1440. The processor 1410 can control the output interface 1440 to communicate with other devices or chips, and to particularly output information or data to other devices or chips.

In some embodiments, the chip can be applied to the terminal device according to the embodiments of the present application, and the chip can be configured to carry out the corresponding process implemented by the terminal device in the methods of the embodiments of the present application, which will not be repeated here for the sake of brevity.

In some embodiments, the chip can be applied to the network device in the embodiments of the application, and can specifically be the core network control plane entity (for example, AMF, SMF, UPF, etc.), and can be configured to carry out corresponding process implemented by the terminal device in the methods in the embodiments of the present application, which will not be repeated here for the sake of brevity.

It should be understood that the chip mentioned in the embodiments of the present application can also be referred to as a system-level chip, a system chip, a chip system, a system-on-chip, or the like.

Figure 16:
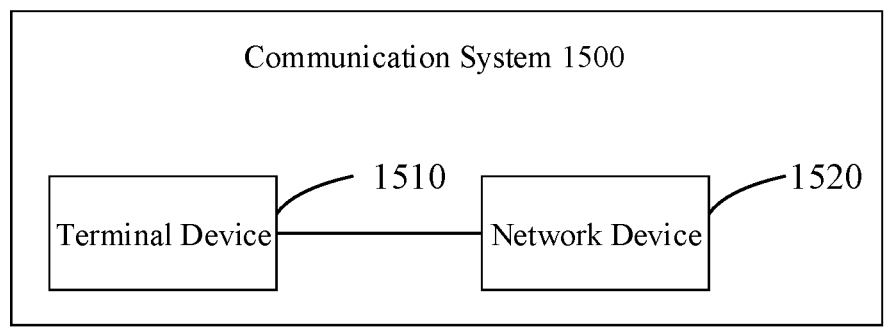
FIG. 16 is a schematic block diagram of a communication system according to an embodiment of the present application.

FIG. 16 is a schematic block diagram of a communication system 1500 according to an embodiment of the present application. As shown in FIG. 16, the communication system 1500 includes a terminal device 1510 and a network device 1520.

The terminal device 1510 can be configured to implement the corresponding functions implemented by the terminal device in the above methods, and the network device 1520 can specifically be the core network control plane entity (for example, AMF, SMF, UPF, etc.), which can be configured to implement the corresponding functions implemented by the network device in the above methods, which will not be repeated here for the sake of brevity.

It should be understood that the processor of the embodiment of the present application can be an integrated circuit chip with signal processing capability. In the implementations, the steps of the foregoing method embodiments can be performed by hardware integrated logic circuits in the processor or instructions in a form of software. The foregoing processor can be a general-purpose processor, a Digital Signal Processor (DSP), an Application Specific Integrated Circuit (ASIC), a Field Programmable Gate Array (FPGA), or other programmable logic devices, discrete gates or transistor logic devices, or discrete hardware components. The methods, steps, and logical blocks disclosed in the embodiments of the present disclosure can be implemented or performed thereby. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present application may be a volatile memory or a non-volatile memory, or may include both volatile and non-volatile memory. In an embodiment, the non-volatile memory can be Read-Only Memory (ROM), Programmable ROM (PROM), erasable PROM (EPROM), and electrically EPROM (EEPROM) or flash memory. The volatile memory may be a Random Access Memory (RAM), which is used as an external cache. By way of exemplary but not restrictive description, many forms of RAM are available, such as Static RAM (SRAM), Dynamic RAM (DRAM), and Synchronous DRAM (SDRAM), Double Data Rate SDRAM (DDR SDRAM), Enhanced SDRAM (ESDRAM), Synch-link DRAM (SLDRAM)) and Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present application also provide a computer-readable storage medium for storing a computer program. In some embodiments, the computer-readable storage medium may be applied to the network device in the embodiments of the present application, and the computer program causes a computer to perform the corresponding process implemented by the network device in the methods of the embodiments of the present application, which will not be repeated here for the sake of brevity. In some embodiments, the computer-readable storage medium may be applied to the mobile terminal/the terminal device in the embodiments of the present application, and the computer program causes the computer to perform the corresponding process implemented by the mobile terminal/the terminal device in the methods of the embodiments of the present application, which will not be repeated here for the sake of brevity.

The embodiments of the present application also provide a computer program product, including computer program instructions. In some embodiments, the computer program product can be applied to the network device in the embodiments of the present application, and the computer program instructions cause the computer to execute the corresponding process implemented by the network device in the methods according to the embodiments of the present application, which will not be repeated here for the sake of brevity. In some embodiments, the computer program product can be applied to the mobile terminal/terminal device in the embodiments of the present application, and the computer program instructions cause the computer to execute the corresponding process implemented by the mobile terminal/terminal device in the methods according to the embodiments of the present application, which will not be repeated here for the sake of brevity.

The embodiments of the present application also provide a computer program. In some embodiments, the computer program can be applied to the network device in the embodiments of the present application. When the computer program runs on a computer, the computer is caused to perform the corresponding processes implemented by the network device in the methods according to the embodiments of the present application, which will not be repeated here for the sake of brevity. In some embodiments, the computer program can be applied to the mobile terminal/terminal device in the embodiments of the present application. When the computer program runs on the computer, the computer is caused to perform the corresponding process implemented by the mobile terminal/terminal device in the methods according to the embodiments of the present application, which will not be repeated here for the sake brevity.

Through the above technical solutions, the data packet can be transmitted through the control plane or the user plane in the 3GPP network without being parsed and routed by an external server, and communication delay can be reduced.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or software depends on the specific application of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

In the several embodiments provided in this application, it should be understood that the disclosed systems, devices, and methods can be implemented in other ways. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may or may not be physically separated, and the components shown as units may or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each unit can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A wireless communication method, comprising:
   receiving, by a network device, a data packet which is transmitted from a first terminal device through a control plane or a user plane within a 3rd Generation Partnership Project (3GPP) network; and
   sending, by the network device, the data packet to a second terminal device through the control plane or the user plane within the 3GPP network,
   wherein there is a first session connection between the first terminal device and the second terminal device, and the first session connection is used for the first terminal device to communicate with the second terminal device, wherein the data packet is sent to the network device through the user plane via the first session connection, and
   wherein sending, by the network device, the data packet to the second terminal device through the control plane or the user plane within the 3GPP network comprises:
      sending, by the network device, the data packet to the second terminal device through the user plane within the 3GPP network by using the first session connection.

2. The method according to claim 1, wherein a User Plane Function (UPF) of the first terminal device and the UPF of the second terminal device are a same first UPF, and the network device is the first UPF, and
   wherein the data packet received by the network device carries first address information of a connection between the first terminal device and the first UPF in the first session connection, and
   wherein sending, by the network device, the data packet to the second terminal device through the user plane within the 3GPP network by using the first session connection comprises:
      determining, by the network device, second address information based on the first address information, wherein the second address information is address information of a connection between the second terminal device and the first UPF in the first session connection; and
      encapsulating the second address information in the data packet and sending the data packet to the second terminal device by the network device.

3. The method according to claim 1, wherein the UPF of the first terminal device is a second UPF, the UPF of the second terminal device is a third UPF other than the second UPF, and the network device is the second UPF, and the data packet received by the network device carries third address information of a connection between the first terminal device and the second UPF in the first session connection, and
   wherein sending, by the network device, the data packet to the second terminal device through the user plane in the 3GPP network by using the first session connection comprises:
      determining, by the network device, fourth address information based on the third address information, wherein the fourth address information is address information of a connection between the second UPF and the third UPF in the first session connection; and
      encapsulating the fourth address information in the data packet and sending the data packet to the second terminal device through the third UPF by the network device.

4. The method according to claim 1, wherein the UPF of the first terminal device is a second UPF, the UPF of the second terminal device is a third UPF other than the second UPF, and the network device is the third UPF, and the data packet received by the network device carries fourth address information of a connection between the second UPF and the third UPF in the first session connection, and
   wherein sending, by the network device, the data packet to the second terminal device through the user plane in the 3GPP network by using the first session connection comprises:
      determining, by the network device, fifth address information based on the fourth address information, wherein the fifth address information is address information of a connection between the third UPF and the second terminal device in the first session connection; and
      encapsulating the fifth address information in the data packet and sending the data packet to the second terminal device by the network device.

5. The method according to claim 1, wherein the network device is a core network entity, the data packet carries at least one piece of information of: an identity of the first session connection, address information of the first session connection, identification information of the first terminal device and identification information of the second terminal device, and the data packet is sent to the network device through the control plane, and
   wherein sending, by the network device, the data packet to the second terminal device through the control plane or the user plane in the 3GPP network comprises:
      determining a next hop node of the data packet by the network device based on the at least one piece of information; and
      sending, by the network device, the data packet to the next hop node through the control plane, so that the data packet is sent to the second terminal device by the next hop node.

6. A network device, comprising:
   a processor, a memory, a transceiver, and instructions stored in the memory that, when executed by the processor, cause the transceiver to:
   receive a data packet which is transmitted from a first terminal device through a control plane or a user plane within a 3rd Generation Partnership Project (3GPP) network; and
   send the data packet to a second terminal device through the control plane or the user plane within the 3GPP network, wherein there are a second session connection between the first terminal device and a UPF of the first terminal device, and a third session connection between the second terminal device and the UPF of the second terminal device, the UPF of the first terminal device and the UPF of the second terminal device are a same fourth UPF, and the network device is the fourth UPF, the data packet carries address information of the third session connection and/or identification information of the second terminal device, and the transceiver is further configured to send the data packet to the second terminal device through the user plane based on the address information of the third session connection and/or the identification information of the second terminal device.

7. The network device according to claim 6, wherein the processor is configured to:

determine the address information of the third session connection based on the identification information of the second terminal device; and encapsulate the address information of the third session connection in the data packet and.

8. The network device according to claim 7, wherein there are a second session connection between the first terminal device and a UPF of the first terminal device, and a third session connection between the second terminal device and the UPF of the second terminal device, the UPF of the first terminal device is a fifth UPF, the UPF of the second terminal device is a sixth UPF other than the fifth UPF, and the network device is the fifth UPF, the data packet carries address information of the third session connection and/or identification information of the second terminal device, wherein the processor is further configured to:

determine the sixth UPF by the network device based on the address information of the third session connection and/or the identification information of the second terminal device; and wherein the transceiver is further configured to:

send the data packet to the second terminal device through the sixth UPF.

9. A terminal device which is a first terminal device, the terminal device comprising a processor, a memory, a transceiver and instructions stored in the memory that, when executed by the processor, cause the transceiver to:

send a data packet to a second terminal device, the data packet comprising address information of a session connection between the second terminal device and a User Plane Function (UPF) or address information of a session connection between the first terminal device and the UPF, wherein the session connection between the first terminal device and the UPF is dedicated to the first terminal device for communication with the second terminal device within a 3rd Generation Partnership Project (3GPP) network, and the address information of the session connection between the second terminal device and the UPF is used for the second terminal device for communication with other terminal devices within the 3GPP network, wherein the transceiver is further configured to:

receive the address information of the session connection between the second terminal device and the UPF or the address information of the session connection between the first terminal device and the UPF sent by a network device.

10. The terminal device according to claim 9, wherein the address information of the session connection between the second terminal device and the UPF is carried in broadcast information or dedicated signaling.

* * * * *